United States Patent
Karuturi et al.

(10) Patent No.: US 9,241,202 B2
(45) Date of Patent: Jan. 19, 2016

(54) METHODS, SYSTEMS, AND COMPUTER READABLE MEDIA FOR DYNAMICALLY AND CONDITIONALLY SETTING SERVICE TRIGGERS IN A COMMUNICATIONS NETWORK

(75) Inventors: Sridhar Karuturi, Raleigh, NC (US); Carlos Alberto Schifferli Lopes, Bellevue, WA (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 595 days.

(21) Appl. No.: 12/903,147

(22) Filed: Oct. 12, 2010

(65) Prior Publication Data

US 2011/0086628 A1    Apr. 14, 2011

Related U.S. Application Data

(60) Provisional application No. 61/250,460, filed on Oct. 9, 2009.

(51) Int. Cl.
*H04W 4/00* (2009.01)
*H04Q 3/00* (2006.01)

(52) U.S. Cl.
CPC .................................. *H04Q 3/0029* (2013.01)

(58) Field of Classification Search
None
See application file for complete search history.

(56) References Cited

U.S. PATENT DOCUMENTS

| | | | |
|---|---|---|---|
| 5,923,744 A | 7/1999 | Cheng | |
| 6,810,243 B2 | 10/2004 | Torabi | |
| 8,934,380 B2 | 1/2015 | Coupland et al. | |
| 2005/0192035 A1* | 9/2005 | Jiang | H04W 8/26 455/461 |
| 2006/0025129 A1* | 2/2006 | Wolfman et al. | 455/432.1 |
| 2006/0217136 A1* | 9/2006 | Bantukul et al. | 455/466 |
| 2008/0057915 A1* | 3/2008 | Lahtiranta et al. | 455/414.1 |
| 2008/0162637 A1* | 7/2008 | Adamczyk | H04L 12/5815 709/204 |
| 2008/0299967 A1* | 12/2008 | Kazmi | H04L 41/5029 455/433 |
| 2008/0318545 A1* | 12/2008 | Kazmi | 455/406 |
| 2010/0029248 A1* | 2/2010 | Shi et al. | 455/411 |
| 2011/0110274 A1 | 5/2011 | Coupland et al. | |
| 2011/0124331 A1* | 5/2011 | Jiang | H04W 8/12 455/432.1 |

OTHER PUBLICATIONS

Witzel et al PCT/EP2005/012788 Published as WO 2007/062674 on Jun. 7, 2007.*
Non-Final Official Action for U.S. Appl. No. 12/902,548 (Sep. 12, 2012).
U.S. Appl. No. 61/220,560, filed Jun. 25, 2009.

(Continued)

*Primary Examiner* — Dai A Phuong
(74) *Attorney, Agent, or Firm* — Jenkins, Wilson, Taylor & Hunt, P.A.

(57) ABSTRACT

Methods, systems, and computer readable media for dynamically and conditionally setting service triggers in a communications network are disclosed. According to one aspect, a system for dynamic and conditional trigger insertion includes a dynamic trigger insertion (DTI) rules database for maintaining conditions or rules for dynamic trigger insertion and a DTI screening module for receiving a first mobility management message that is associated with a mobile subscriber, using the DTI rules database to determine whether a condition or rule for dynamic trigger insertion is satisfied, and, in response to determining that a condition or rule for dynamic trigger insertion is satisfied, generating a second mobility management message that includes a dynamically inserted trigger condition.

29 Claims, 10 Drawing Sheets

(56) References Cited

OTHER PUBLICATIONS

"Intelligent Network (IN)," http://www.iec.org, pp. 1-32 (Publication Date Unknown).
"3GPP Architecture Evolution Towards Flat Architecture," EFORT, pp. 94-114 (Publication Date Unknown).
"LTE/SAE Target Architecture," EFORT, p. 90 (Publication Date Unknown).
Non-Final Office Action for U.S. Appl. No. 12/902,548 (May 16, 2013).
Patent Certificate for Indian Patent No. 263372 (Oct. 23, 2014).
Notice of Allowance and Fee(s) Due for U.S. Appl. No. 12/902,548 (Sep. 11, 2014).
Advisory Action for U.S. Appl. No. 12/902,548 (Jun. 12, 2014).
Final Office Action for U.S. Appl. No. 12/902,548 (Mar. 14, 2014).

* cited by examiner

METHODS, SYSTEMS, AND COMPUTER READABLE MEDIA FOR DYNAMICALLY AND CONDITIONALLY SETTING SERVICE TRIGGERS IN A COMMUNICATIONS NETWORK

PRIORITY CLAIM

This application claims the benefit of U.S. Provisional Patent Application Ser. No. 61/250,460, filed Oct. 9, 2009; the disclosure of which is incorporated herein by reference in its entirety.

TECHNICAL FIELD

The subject matter described herein relates to methods and systems for providing service triggers in a communications network. More particularly, the subject matter described herein relates to methods, systems, and computer readable media for dynamically and conditionally setting service triggers in a communications network.

BACKGROUND

Service triggers associated with a subscriber, such as originating call attempt triggers, terminating call attempt triggers, and others, may be set at a switching office. These triggers may be fired or activated at a switching office based on an attribute of the call (e.g., inbound, outbound), the called or calling party associated with the call/call attempt, or other call attributes. In general, a trigger is implemented in software at a switching office and causes the generation of a database query message when a condition is met.

In a traditional public switched telephone network (PSTN), a switch, which may include a central office (CO), a service switching function (SSF), or a service switching point (SSP) acts as the trigger point for further services to be invoked during a call. The switch implements the basic call state machine (BCSM), which is a finite state machine that represents an abstract view of a call from beginning to end (off hook, dialing, answer, no answer, busy, hang up, etc.) As each state is traversed, the exchange encounters detection points (DPs), such as an initial detection point (IDP), at which the switch may invoke a query to the SCP to wait for further instructions on how to proceed. Trigger criteria are defined by the operator and might include the subscriber calling number or the dialed number. The SSF is responsible for entertaining calls requiring value added services.

In some instances, it may be desirable to conditionally set service triggers in a communications network. For example, in mobile communications networks, a mobile communications service provider may desire to conditionally set triggers for subscribers of its network only when the subscribers are roaming. Triggers for mobile network subscribers are stored in subscriber records stored in an HLR. In one example where the CAMEL protocol is used, triggers are stored in CAMEL subscription information records stored in the HLR. Although CAMEL subscription information records are used to store triggers and can be used to set such triggers for mobile subscribers, they cannot be conditionally set using the conventional insert subscriber data procedure because all triggers stored in a CAMEL subscription information record in the HLR would be communicated to the serving mobile switching center (MSC) regardless of whether the subscriber is roaming or not. As a result, triggers that are intended to be set for roaming subscribers would also be set when the subscriber is located in the home network, resulting in unnecessary service invocation.

Accordingly, in light of these difficulties, there exists a need for methods, systems, and computer readable media for dynamically and conditionally setting triggers in a communications network.

SUMMARY

According to one aspect, a system for dynamic and conditional trigger insertion includes a dynamic trigger insertion (DTI) rules database for maintaining conditions or rules for dynamic trigger insertion and a DTI screening module for receiving a first mobility management message that is associated with a mobile subscriber, using the DTI rules database to determine whether a condition or rule for dynamic trigger insertion is satisfied, and, in response to determining that a condition or rule for dynamic trigger insertion is satisfied, generating a second mobility management message that includes a dynamically inserted trigger condition.

According to another aspect, a method for dynamic and conditional trigger insertion includes, receiving, at a node in a telecommunications network, a first mobility management message that is associated with a mobile subscriber; determining whether a condition or rule for dynamic trigger insertion is satisfied; and, in response to determining that a condition or rule for dynamic trigger insertion is satisfied, generating a second mobility management message that includes a dynamically inserted trigger.

The subject matter described herein for dynamic and conditional trigger insertion may be implemented in hardware, software, firmware, or any combination thereof. As such, the terms "function" or "module" as used herein refer to hardware, which may additionally include software and/or firmware, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The subject matter described herein includes methods, systems, and computer readable media for dynamically and conditionally setting service triggers in a communications network.

In one embodiment, the subject matter described herein includes determining whether a received mobility management message requires dynamic trigger insertion, and, in response, intercepting and modifying the contents of the mobility management message (e.g., a GSM MAP Insert Subscriber Data (ISD) message) that conveys subscriber services information from an HLR/HSS to a serving switching office, such as an MSC. A dynamic trigger insertion (DTI) module is adapted to, if a dynamic and conditioned trigger insertion condition is met, intercept and modify the ISD message so as to include a new service trigger (e.g., CAMEL service trigger) in the ISD or to modify an existing service trigger already contained in the ISD message. The modified ISD message is relayed to the serving switching office, where the service trigger (e.g., CAMEL call origination attempt trigger) is set.

Reference will now be made in detail to exemplary embodiments of the present invention, examples of which are illustrated in the accompanying drawings. Wherever possible, the same reference numbers will be used throughout the drawings to refer to the same or like parts.

Figure 1:
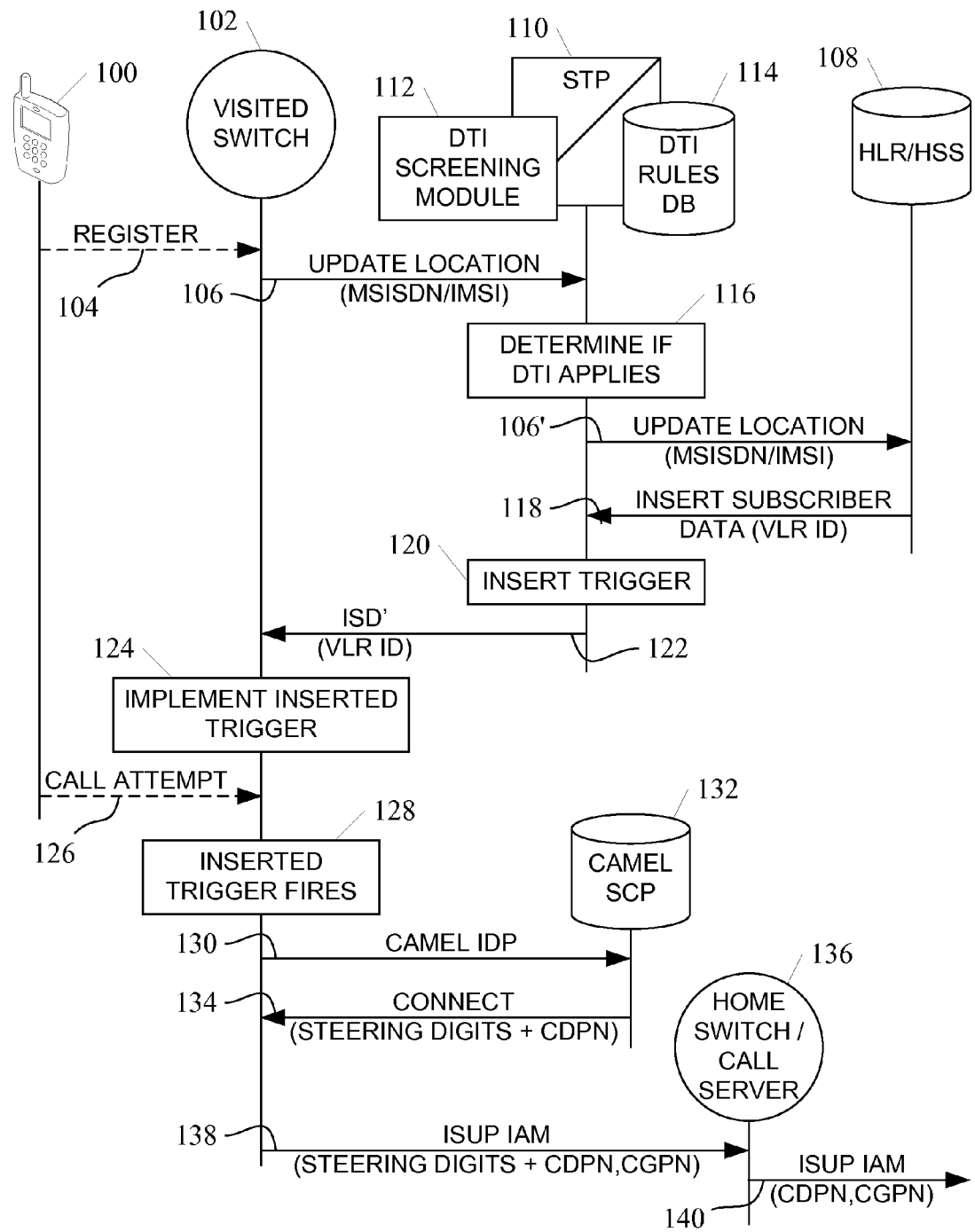
FIG. 1 is a block diagram showing an exemplary system for dynamically and conditionally setting service triggers in a communications network according to an embodiment of the subject matter described herein.

FIG. 1 is a block diagram showing an exemplary system for dynamically and conditionally setting service triggers in a communications network according to an embodiment of the subject matter described herein. In the embodiment illustrated in FIG. 1, a subscriber using a mobile station (MS) 100 has roamed into a mobile network that is served by a visited switch 102, which may be a mobile switching center (MSC), a gateway mobile switching center (GMSC), a media gateway controller (MGC), a class 5 switch, and the like. In response to detection of the presence of MS 100, e.g., when MS 100 makes a registration request 104, visited switching office 102 notifies the subscriber's home network of the current location of mobile terminal 100, e.g., by issuing a mobile application part (MAP) update location message 106 directed to the home location register/home subscriber server (HLR/HSS) 108 in the subscriber's home network.

Update location message 106, which includes an identifier associated with mobile terminal 100, is routed through and intercepted by a signaling message routing node, such as signaling message transfer point (STP) 110, which contains a dynamic trigger insertion (DTI) module 112. STP 110 forwards update location message 106 (or generates and sends a new update location message 106') to HLR/HSS 108.

In one embodiment, DTI module 112 processes update location message 106 according to trigger insertion rules, which may be stored in a DTI rules database 114 or other storage means. For example, DTI module 112 may analyze an incoming mobility management message to determine whether DTI applies. In the embodiment illustrated in FIG. 1, at block 116, DTI module 112 may determine, based on the received update location message 106, that the registering mobile subscriber is currently roaming and that subsequent or related insert subscriber data (ISD) message(s) should be intercepted and modified. In one embodiment, DTI module 112 and/or DTI rules database 114 may use intercepted update location messages to create and maintain a list of mobile subscribers that are known to be roaming. In this embodiment, subsequent insert subscriber data messages may be first compared to this list of roaming subscribers to determine whether the received ISD messages is a candidate for modification, e.g., by inserting a dynamic trigger. Alternatively, DTI rules database 114 may be provisioned with subscriber identifiers, including but not limited to mobile station integrated services digital network (MSISDN) numbers, international mobile subscriber identity (IMSI) numbers, etc., that have been associated with the DTI service. Likewise, DTI rules may be based on ingress signaling link/linkset, time of day, day of week, other characteristics.

In alternative embodiments, DTI module 112 may be configured to take no action in block 116 (or it skip entirely.) For example, the step of determining whether DTI applies may be deferred, e.g., by performing the determination step as a prerequisite to the insert trigger 120 actions. In this embodiment, the actions taken by STP 110 in block 116 would be combined with the actions taken in block 120 to create a new block 120.

Referring again to the embodiment illustrated in FIG. 1, HLR/HSS 108 receives update location message 106/106', and responds by issuing a MAP insert subscriber data (ISD) message 118. DTI module 110 intercepts ISD message 118 and determines whether any DTI rules within DTI rules database 114 apply. For example, DTI module 112 may determine that ISD message 118 pertains to a subscriber to the home network, but that the message is addressed to a visitor location register (VLR) or other node that is not part of the home network, and may thus conclude that the network subscriber is roaming. DTI module 112 may then search DTI rules database 114 to see if any DTI rules apply to roaming subscribers.

Tables 1 and 2, below, illustrate exemplary rules or conditions that may be used by a dynamic trigger screening module to determine whether dynamic trigger insertion is required.

TABLE 1

Exemplary Link/Linkset-Specific Rules

| Ingress Link/Linkset | Service Trigger Type | Service Trigger Parameters |
|---|---|---|
| LSForeign1 | CAMEL Call Origination Attempt | CAMEL SCP Address, etc. |

TABLE 2

Exemplary Subscriber-Specific Rules

| MSISDN | Service Trigger Type | Service Trigger Parameters |
|---|---|---|
| 9193803814 | CAMEL Call Origination Attempt | CAMEL SCP Address, etc. |

In one exemplary rule, a trigger may be dynamically inserted if a subscriber is roaming. In Table 1, for example, it may be determined that a subscriber is roaming if the ISD message arrives on a foreign linkset (LSForeign1). In an alternate example, the DTI screening module may examine parameters in the ISD message, such as the MSC ID, to determine whether the serving MSC is a non-home MSC.

In Table 2, above, a subscriber specific trigger is set for a particular subscriber's MSISDN. Such a trigger could be set by a platform separate from an HLR to dynamically set a trigger for the subscriber to provide a service to the subscriber that is not provisioned in the subscriber's CAMEL service information record in the HLR.

If DTI rules apply, DTI module 110 may modify ISD message 118 accordingly. For example, at block 120, DTI module 112 may modify ISD message 118 to include a new CAMEL service trigger. The modified ISD message (ISD') 122 is then forwarded to visited switch office 102, which in block 124 implements the CAMEL service trigger. If no DTI rules apply, DTI module 110 may simply forward the unmodified ISD message to visited switch 102, which does not perform the actions of block 124.

A variety of triggers may be inserted into modified ISD message 122 and implemented by visited switch 102. Examples of triggers include, but are not limited to, subscribed or line-based triggers, group-based triggers, and office-based triggers. Subscribed triggers are provisioned to the customer's line so that any calls originating from or terminating to that line would encounter the trigger. Group-based triggers are assigned to groups of subscribers—e.g., business or Centrex groups. Any member of a software-defined group will encounter the trigger. Office-based triggers are available to everyone who is connected to the telephone switching office or has access to the North American numbering plan. Office-based triggers are not assigned to individuals or groups. Other trigger examples include the N11 trigger, the 3-6-10 digit trigger, and the termination attempt trigger. Other triggers are contemplated.

In one example, the inserted trigger may be an originating call attempt trigger. When a subscriber with which the service trigger is set attempts to place a call, the CAMEL call origination attempt trigger is fired by the serving switch. Referring to the embodiment illustrated in FIG. 1, for example, the mobile subscriber having a calling party number (CgPN) attempts to call another subscriber having a called party number (CdPN), shown as call attempt 126, which is detected at visited switch 102. Within visited switch 102, the inserted trigger fires (block 128) in response to detecting call attempt 124, causing visited switch 102 to launch a CAMEL IDP query 130 to a CAMEL service control point (SCP) 132. In one embodiment, the CAMEL IDP query may include the called party number (CdPN) and/or the calling party number (CgPN).

CAMEL SCP 132 receives the IDP query and uses information provided in the IDP query to determine the appropriate routing for the call. For example, CAMEL SCP 132 may return a RELEASE message to the serving switch (indicating to the switch that the call should not proceed) or a CONTINUE message (indicating the switch should route the call as per the switches provisioned routing rules) or a CONNECT message (indicating the switch should use the routing information returned in the CONNECT to route the call).

Table 3, below, illustrates an exemplary rule that may be provisioned at the SCP to steer a call to a particular location, such as the home network of a mobile subscriber.

TABLE 3

Exemplary CAMEL SCP Call Routing/Steering Rules

| Calling Party MSISDN | Steering Digits (RN, etc.) |
|---|---|
| 9193803814 | 2124405555 |

Using the SCP record illustrated in Table 3, a CAMEL IDP query that includes the calling party MSISDN 9193803814 will result in locating the steering digits 2124405555, which may be the address of a CAMEL SCP, for example, which are sent back to the originating MSC and used to steer the call to the home network of a subscriber.

In the embodiment illustrated in FIG. 1, CAMEL SCP 132 sends a CONNECT message 134 to visited switch 102. In one embodiment, CONNECT message 134 includes steering digits as well as the original CdPN, which may be in concatenated form. The routing information included in the CONNECT message may include steering digits, a routing number (RN), or any routable identifier/address (e.g., 2124405555). The original CdPN identifier (e.g., 9193803814) is post-pended to the steering digits/RN/routable address identifier (e.g., 2124405555#9193803814).

In the case where the serving switch receives a CONNECT message, the serving switch uses the steering digits (e.g., 2124405555) to determine an egress route from the switch. The serving switch generates an ISUP IAM message that includes both the steering digit and original CdPN information. In one embodiment, the steering digit and original CdPN info is included in the ISUP IAM CdPN parameter in the concatenated/post-pended format (e.g., 2124405555#9193803814).

In one embodiment, the ISUP IAM is received by a switching office/node that is adapted to strip out/remove the steering digit information from the CdPN parameter, leaving the original CdPN identifier. The switch then routes the call using the CdPN identifier.

In the embodiment illustrated in FIG. 1, visited switch 102 uses the steering digits to route the call. In this example, the roaming subscriber's call is routed to a switching office/call server 136 in the subscriber's home network. For example, visited switch 102 may issue an ISUP IAM message 138 that includes the steering digits as well as the called party number CdPN and the calling party number CgPN. Home switching office/call server 136 is configured to strip out the steering digit information from ISUP IAM message 138 and proceed with call setup towards the original CdPN, e.g., by sending ISUP IAM message 140. In one embodiment, the incoming ISUP IAM message 138 may be modified and forwarded; in another embodiment, the incoming ISUP IAM message 138 may be discarded and a new ISUP IAM message 140 may be generated instead.

In one embodiment, DTI screening module 112 is adapted to monitor/screen mobility management messages (e.g., GSM MAP LocationUpdate messages) destined for an HLR/HSS in order to determine which mobile subscribers are roaming in a foreign network. Once identified, ISD messages associated with these roaming subscribers are targeted for interception so as to provide the dynamic trigger insertion functionality previously described.

In other embodiments, DTI screening module 112 may target select mobile subscribers for DTI service based on any number of criteria including but not limited to, roaming status, day of week, time of day, subscriber ID, network congestion conditions/status, etc.

In one embodiment DTI screening module 112 may be integrated with or coupled with an SS7 signal transfer point routing node. In other embodiments DTI screening module 112 may be incorporated into other network elements, such as a gateway MSC, an HLR/HSS, or a stand-alone DTI node.

Figure 2:
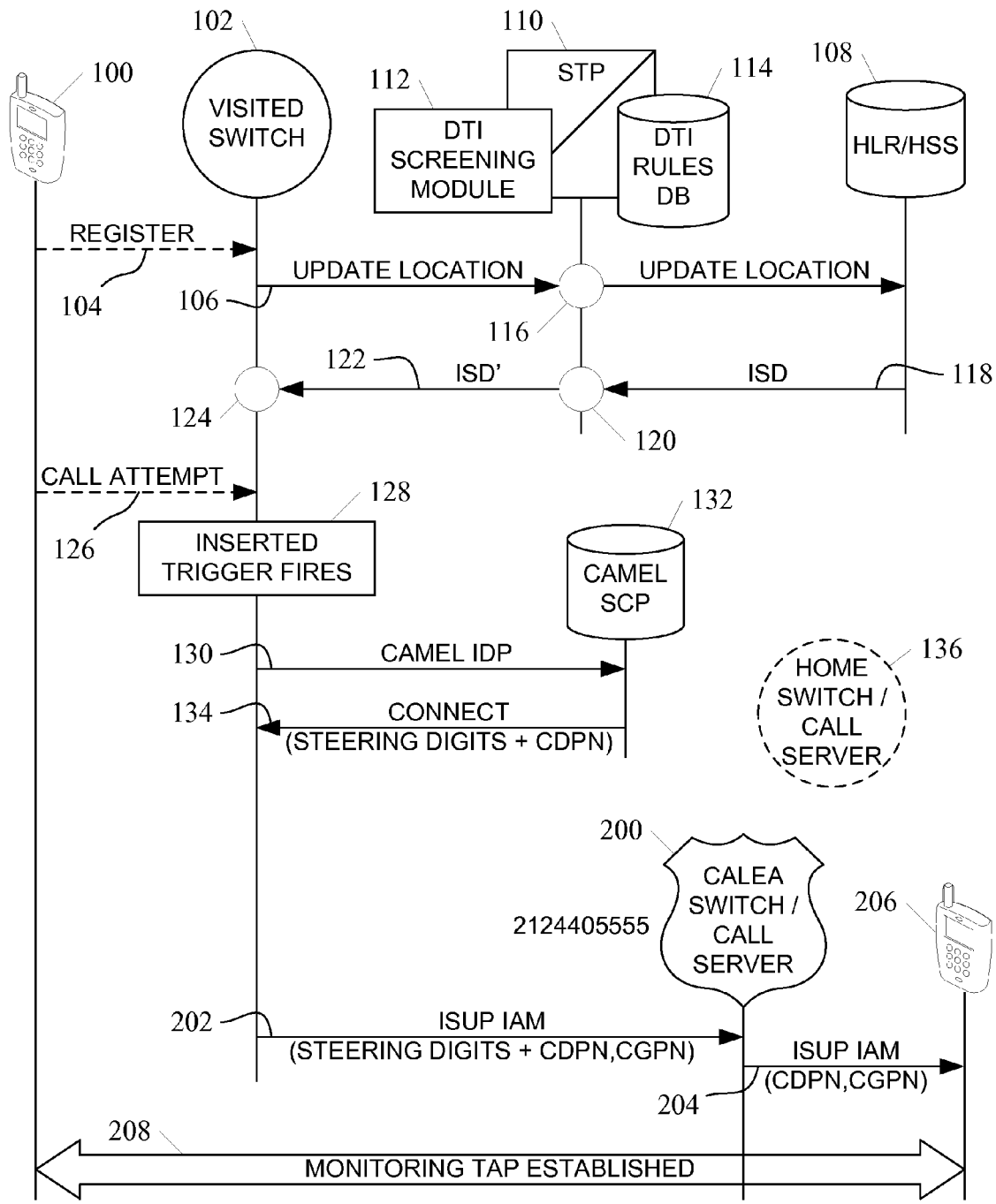
FIG. 2 is a block diagram showing an exemplary system for dynamically and conditionally setting service triggers for implementing law enforcement (CALEA) functions in a communications network according to an embodiment of the subject matter described herein.

FIG. 2 is a block diagram showing an exemplary system for dynamically and conditionally setting service triggers in a communications network according to another embodiment of the subject matter described herein. Elements MS 100, visited switching office 102, registration request 104, update location message 106, HLR/HSS 108, STP 110, DTI module 112, DTI rules database 114, action block 116, ISD message 118, action block 120, modified ISD message 122, action block 124, call attempt 126, trigger firing event 128, CAMEL IDP query 130, and CAMEL SCP 132 are the same as like-numbered elements in FIG. 1, and their descriptions will therefore not be repeated here. In the embodiment illustrated in FIG. 2, however, DTI screening module 112 is configured to implement a law enforcement surveillance (CALEA) tap. In this embodiment, DTI screening module 112 is provisioned with the identities of mobile subscribers that are to be placed under surveillance, and CAMEL SCP 132 returns steering digits associated with a CALEA switch/call server 200.

Table 4, below, includes an example rule that defines a condition that may be detected by DTI screening module 112. In Table 4, calls originating from 9193803814 will cause a query to be sent to CAMEL SCP 132.

TABLE 4

Exemplary Subscriber-Specific Rules

| MSISDN Under Surveillance | Service Trigger Type | Service Trigger Parameters |
|---|---|---|
| 9193803814 | CAMEL Call Origination Attempt | CAMEL SCP Address, etc. |

Table 5, below, includes an example call routing/steering rule that may be applied by CAMEL SCP 132. In Table 5, calls that originate from 9193833814 will be steered/routed to 212440555, i.e., to CALEA server 200.

TABLE 5

Exemplary CAMEL SCP Call Routing/Steering Rules

| MSISDN | Steering Digits (RN, etc.) |
|---|---|
| 9193803814 | 2124405555 |

Figure 3:
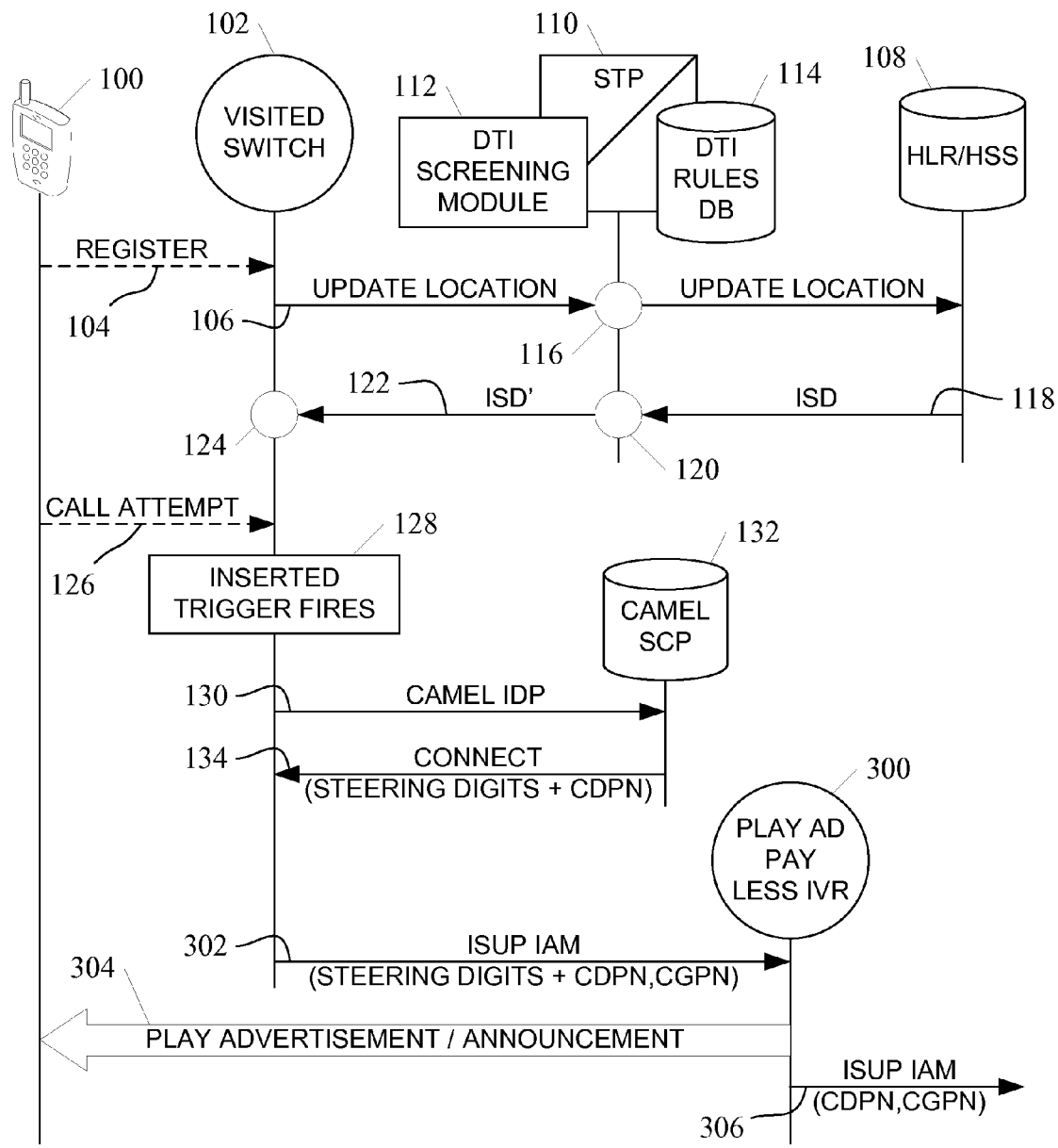
FIG. 3 is a block diagram showing an exemplary system for dynamically and conditionally setting service triggers for implementing a "Play Ad Pay Less" type service in a communications network according to an embodiment of the subject matter described herein.

FIG. 3 is a block diagram showing an exemplary system for dynamically and conditionally setting service triggers in a communications network according to yet another embodiment of the subject matter described herein. Elements MS 100, visited switching office 102, registration request 104, update location message 106, HLR/HSS 108, STP 110, DTI module 112, DTI rules database 114, action block 116, ISD message 118, action block 120, modified ISD message 122, action block 124, call attempt 126, trigger firing event 128, CAMEL IDP query 130, and CAMEL SCP 132 are the same as like-numbered elements in FIG. 1, and their descriptions will therefore not be repeated here. In the embodiment illustrated in FIG. 3, however, DTI screening module 112 is configured to implement a "Play Ad Pay Less" type service. With this type of service, a mobile subscriber agrees to receive, for example, communication services at a discounted rate in exchange for agreeing to listen to a short advertisement at the beginning of each call attempt. In this embodiment, mobile subscribers that have opted into this service are provisioned in DTI screening module 112, and CAMEL SCP 132 returns steering digits associated with a Play Ad Pay Less IVR/call server 300. Prior to being connected to the called party, MS 100 is connected to server 300. In the embodiment illustrated in FIG. 3, visited switch 102 may issue an ISUP IAM message 302 containing the steering digits along with the called party number (CdPN) and calling party number (CgPN). Server 300 may then play the advertisement or announcement to MS 100, shown as media stream 304 in FIG. 3. The call setup then proceeds. For example, server 300 may then issue an ISUP IAM message 306 that includes the CdPN and CgPN information but from which the steering digits have been stripped out.

Table 6, below, illustrates a rule that may be used by DTI screening module 112 to dynamically set a trigger for calls originating from 9193803814.

TABLE 6

Exemplary Subscriber-Specific Rules

| MSISDN Play Ad Pay Less Subscriber | Service Trigger Type | Service Trigger Parameters |
|---|---|---|
| 9193803814 | CAMEL Call Origination Attempt | CAMEL SCP Address, etc. |

Table 7, below, illustrates a rule that may be provisioned at CAMEL SCP 132 that communicates steering digits for the play add pay less IVR to steer calls originating from 9193803814 to the play add pay less IVR 300.

TABLE 7

Exemplary CAMEL SCP Call Routing/Steering Rules

| MSISDN | Steering Digits (RN, etc.) |
|---|---|
| 9193803814 | 2124405555 |

Figure 4:
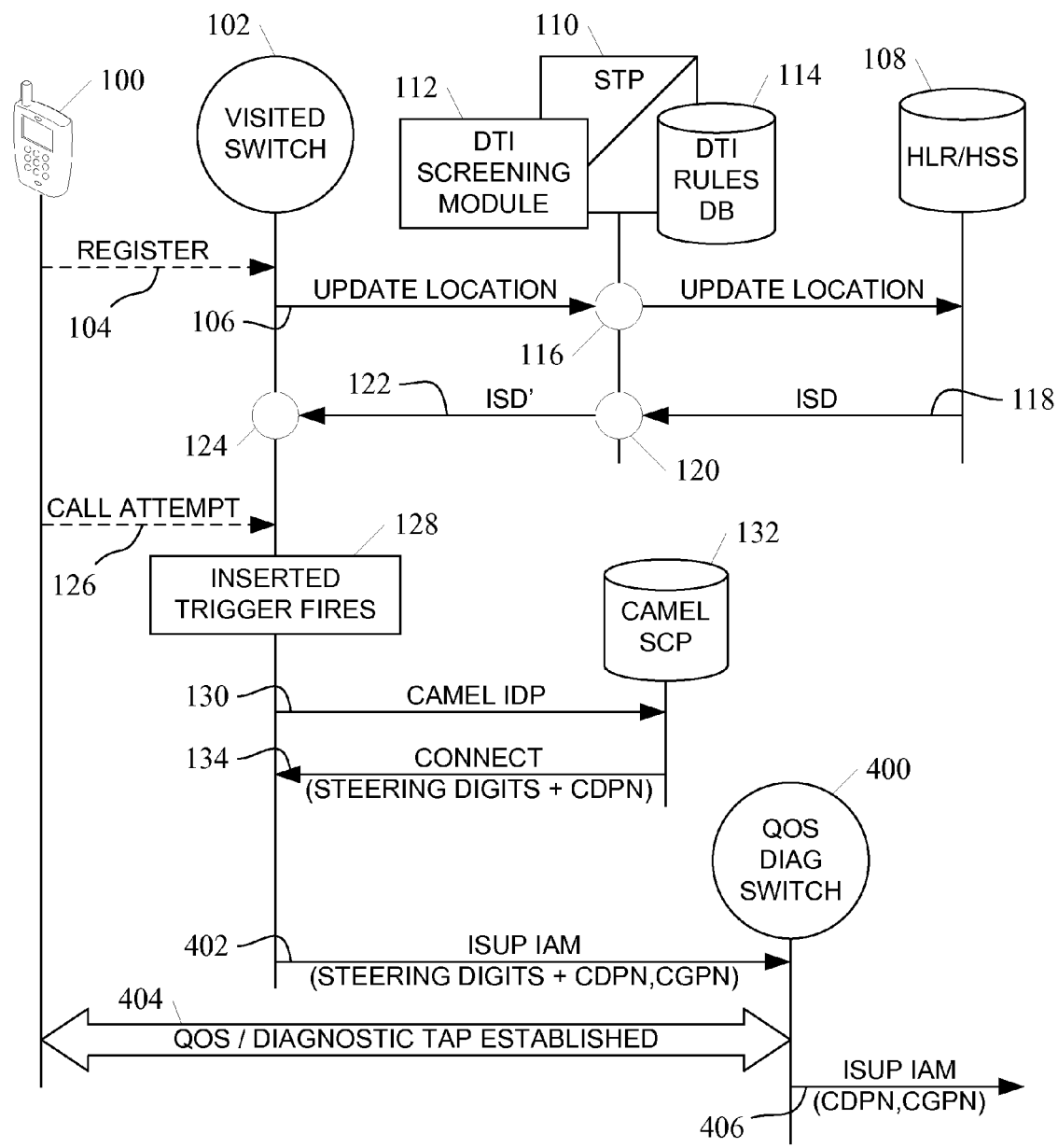
FIG. 4 is a block diagram showing an exemplary system for dynamically and conditionally setting service triggers for implementing a quality of server (QoS) diagnostic tap in a communications network according to an embodiment of the subject matter described herein.

FIG. 4 is a block diagram showing an exemplary system for dynamically and conditionally setting service triggers in a communications network according to yet another embodiment of the subject matter described herein. Elements MS 100, visited switching office 102, registration request 104, update location message 106, HLR/HSS 108, STP 110, DTI module 112, DTI rules database 114, action block 116, ISD message 118, action block 120, modified ISD message 122, action block 124, call attempt 126, trigger firing event 128, CAMEL IDP query 130, and CAMEL SCP 132 are the same as like-numbered elements in FIG. 1, and their descriptions will therefore not be repeated here. In the embodiment illustrated in FIG. 4, however, DTI screening module 112 is configured to implement a quality of server (QoS) diagnostic tap. In this embodiment, a mobile subscriber that is experiencing a QoS issue can contact a Customer Care center associated with their home network operator. The Customer Care center is adapted to dynamically provision the mobile subscriber in DTI screening module 112 and CAMEL SCP 132 in a manner such that the next call attempt that the mobile subscriber makes is steered/routed to a switch in the home operator's network where QoS diagnostics may be performed. In the embodiment illustrated in FIG. 4, DTI screening module 112 and CAMEL SCP 132 are configured such that calls from MS 100 are redirected by visited switch 102 towards QoS diagnostic switch 400. In response, a QoS/diagnostic tap 404 is established between MS 100 and QoS diagnostic switch 400. QoS diagnostic switch 400 then proceeds with the call setup attempt by sending ISUP IAM message 406 to the called party switch. QoS diagnostic switch 400 may use QoS/diagnostic tap 404 to monitor the call progress and collect data on the QoS, report the results of the diagnosis, perform QoS diagnostic test, and so on.

Table 8, below, illustrates an exemplary rule that may be used by DTI screening module 112 to dynamically set a trigger for calls originating from 9193803814 to result in a query to CAMEL SCP 132.

TABLE 8

Exemplary Subscriber-Specific Rules

| MSISDN With Diagnostic Need | Service Trigger Type | Service Trigger Parameters |
|---|---|---|
| 9193803814 | CAMEL Call Origination Attempt | CAMEL SCP Address, etc. |

Table 9, below, illustrates a record that may be provisioned at CAMEL SCP 132 for calls originating from 9193803814 to steer the call to QoS diagnostics switch/call server 400 as illustrated in FIG. 4.

TABLE 9

Exemplary CAMEL SCP Call Routing/Steering Rules

| MSISDN | Steering Digits (RN, etc.) |
|---|---|
| 9193803814 | 2124405555 |

Figure 5A:
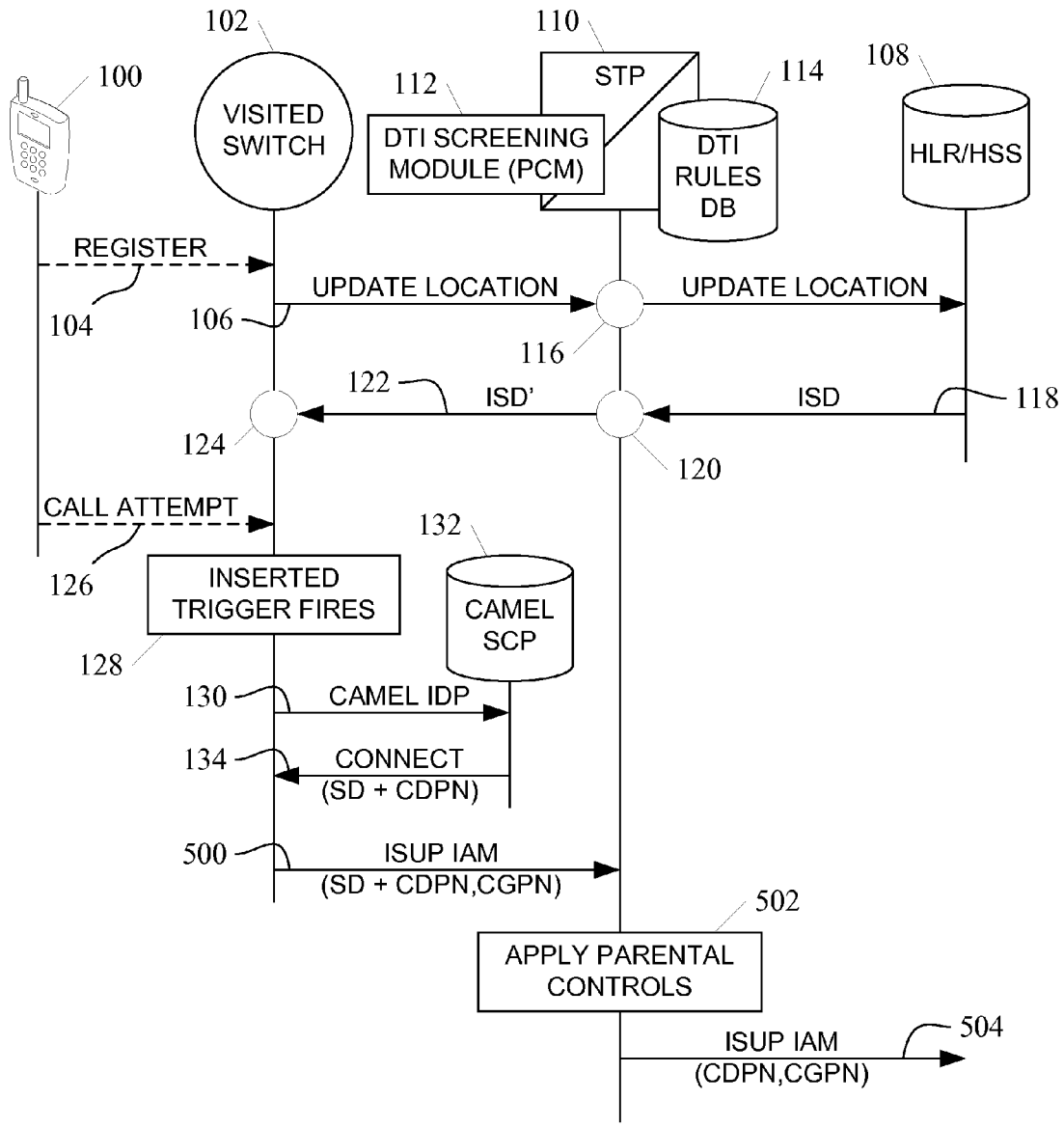
FIGS. 5A and 5B are a block diagrams showing an exemplary system for dynamically and conditionally setting service triggers for implementing parental controls in a communications network according to an embodiment of the subject matter described herein.

FIG. 5A is a block diagram showing an exemplary system for dynamically and conditionally setting service triggers in a communications network according to yet another embodiment of the subject matter described herein. Elements MS 100, visited switching office 102, registration request 104, update location message 106, HLR/HSS 108, STP 110, DTI module 112, DTI rules database 114, action block 116, ISD message 118, action block 120, modified ISD message 122, action block 124, call attempt 126, trigger firing event 128, CAMEL IDP query 130, and CAMEL SCP 132 are the same as like-numbered elements in FIG. 1, and their descriptions will therefore not be repeated here. In the embodiment illustrated in FIG. 5A, however, DTI screening module 112 is configured to implement a parental controls service. For brevity, a DTI screening module that is configured to provide a parental control service will hereinafter be referred to as parental control module (PCM) 112. In this embodiment, a parent or guardian can request parental controls for the MSISDN associated with their child's phone. The child's MSISDN is provisioned in PCM 112 and CAMEL SCP 132 in a manner such that all call origination attempts by the child are steered/routed to a switch in the home operator's network where parental controls service may be applied. For example, in the embodiment illustrated in FIG. 5A, DTI screening module 112 detects when the child's cell phone MS 100 registers with the network, determines from DTI rules database 114 that the child's phone is subject to parental controls, and modifies the ISD message 118 to include a additional trigger that instructs visited switch 102 to query CAMEL SCP 132 whenever there is a call attempt from the child's phone MS 100. CAMEL SCP 132 will steer the call setup message 500 through STP 110, which implements parental controls. At block 502, STP 110 applies the parental controls, which may include allowing the call, in which STP 110 strips the steering digits from incoming call setup message 500 and forwards modified ISUP IAM message 504, which does not include the steering digits. Application of parental controls may also include blocking the call, notifying the parent that the call attempt is being made, waiting for approval for the parent before allowing the call, etc.

Figure 5B:
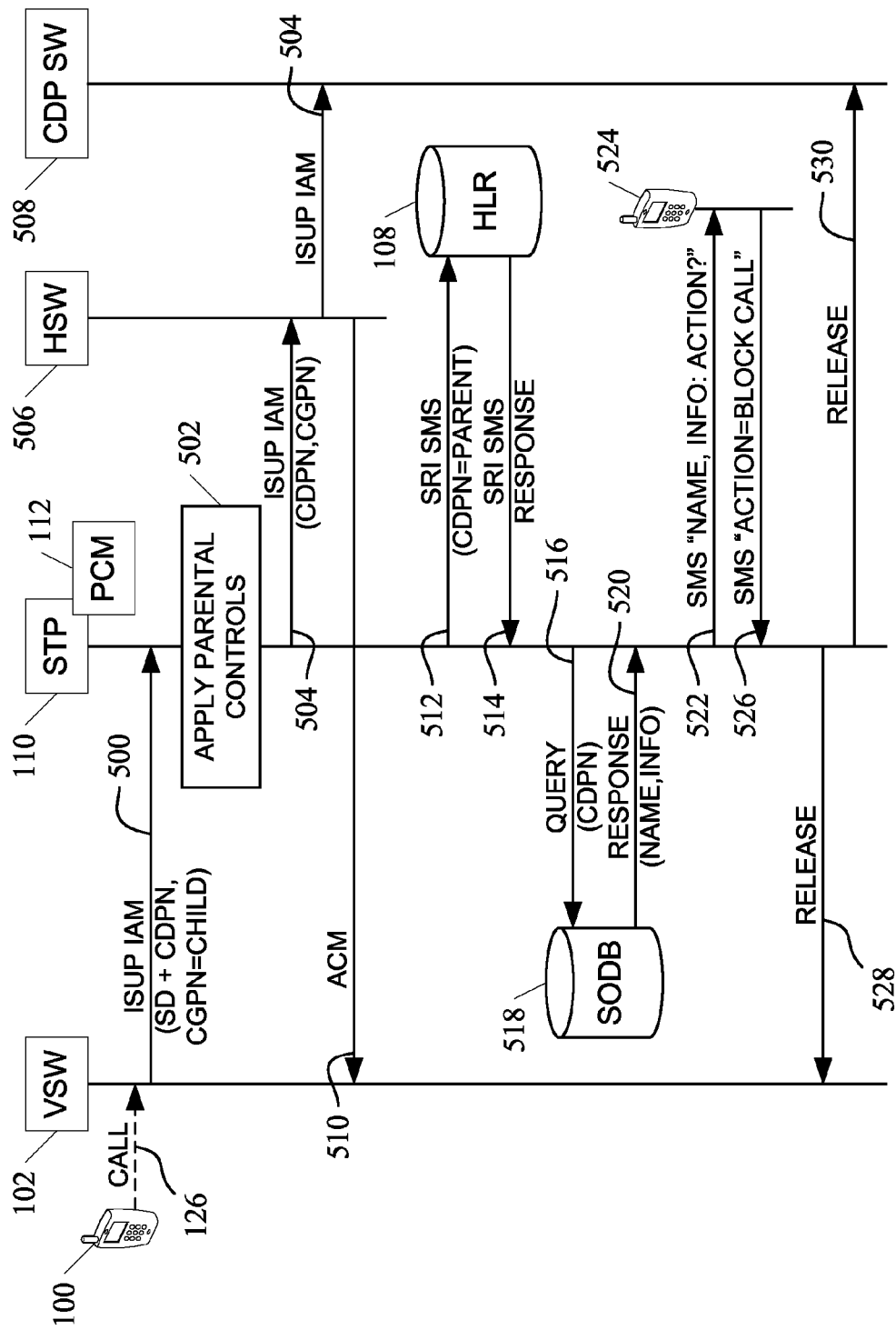

FIG. 5B is a block diagram showing in more detail an exemplary system for dynamically and conditionally setting service triggers in a communications network according to yet another embodiment of the subject matter described herein. Elements MS 100, visited switching office 102, HLR/HSS 108, STP 110, PCM 112, call attempt 126, ISUP IAM message 500, application of parental controls 502, and ISUP IAM message 504 are the same as like-numbered elements in FIG. 5A, and their descriptions will therefore not be repeated here. In the embodiment illustrated in FIG. 5B, the child's originating call attempt 126 triggers the originating switch, VS 102, to route or steer the call to the child's home network. Within the home network, the ISUP IAM message 500 is intercepted at a gateway STP 110 that includes parental control functionality. In one embodiment, this functionality may be provided by parental control module 112, which may be within or associated with STP 110. In the embodiment illustrated in FIG. 5B, the ISUP IAM message 504, with the steering digits removed, has been directed or steered to a home network switch 506, which forwards message 504 to a switch serving the called party, CDP SW 508. Home network switch 506 sends an ISUP address complete (ACM) message 510 to originating switch VS 102.

Meanwhile, PCM 112 sends a query 512 to HLR 108 to determine the location of the parent to be notified. HLR 108 sends a response message 514 with the location information. In one embodiment, PCM 112 may send a query message 516 to a sex offender database SODB 518 to determine whether the called party is a registered sex offender. SODB 518 may send a response message 520 that includes the name of the called party along with information about the called party status, e.g., that they are or are not a known sex offender, to PCM 112. PCM 112 may then notify the parent that the child is placing a call. Depending on the screening rules used, PCM 112 may simply inform the parent of the call or it may give the parent the option to block the call. Likewise, PCM 112 may provide the called party name and may also indicate whether the called party is a sex offender or other type of criminal.

In one embodiment, PCM 112 sends an SMS message 522 to the parent's cell phone 524. SMS message 522 may include the called party name and information, and may prompt the parent to take an action, such as "allow", "block", etc. In the embodiment illustrated in FIG. 5B, the parent may send a reply SMS message 526 to PCM 112 indicating the action to be taken, such as "block call". In response to the command to block the call, for example, PCM 112 may issue release messages 528 and 530 to both the originating switch VS 102 and the called party switch CDP SW 508, respectively, to terminate the call or call attempt in progress.

Table 10, below, illustrates an example rule that may be provisioned with DTI screening module 112 to dynamically set a trigger for calls originating from 9193803814, such that calls originating from this number will result in a query to CAMEL SCP 132.

TABLE 10

Exemplary Subscriber-Specific Rules

| MSISDN With Diagnostic Need | Service Trigger Type | Service Trigger Parameters |
|---|---|---|
| 9193803814 | CAMEL Call Origination Attempt | CAMEL SCP Address, etc. |

Table 11, below, is an example record at the SCP that contains steering information that directs call originating from 9193803814 to STP 110 so that parental controls may be applied.

TABLE 11

Exemplary CAMEL SCP Call Routing/Steering Rules

| MSISDN | Steering Digits (RN, etc.) |
|---|---|
| 9193803814 | 2124405555 |

In an alternative embodiment, parental control module 112 may include whitelist or blacklist rule to respectively allow or deny calls. Such a function would obviate the need to continually request permission from a parent. In one embodiment, actions that may be taken by a parent may include "allow always" (which updates the whitelist so that subsequent calls are allowed without requiring parental approval), "allow once" (which does not update the whitelist), "block always" (which updates the blacklist so that subsequent calls are denied without requiring parental action), "block once" (which does not update the blacklist). Other actions that may be taken by the parent may include "allow but notify", which would allow the call to go through but would send a notification message, such as an SMS message, every time the child calls or is called by that person.

Although the examples listed above involve a call attempt being made by a child, the same principles may be applied to calls where the child is the called party rather than the calling party. In one embodiment, the parental control function may modify the contents of the intercepted ISUP IAM message in a manner that signals the destination switch/call server (e.g., 2124405555) that the call should redirected to an tone and announcement server/IVR which informs the calling party (i.e., child) that their call has been blocked/is not allowed. In one embodiment, this signaling may be accomplished by inserting one or more "flag" digits in the CdPN parameter of the ISUP IAM at the STP prior to routing, where the flag digits are subsequently interpreted by the destination switch as a signal that the call should not be completed and that a tone/announcement should be played to the calling party.

Other parental control function embodiments can be found in co-pending U.S. Provisional Patent Application Ser. No. 61/220,560, filed Jun. 25, 2009, the disclosure of which is incorporated herein by reference in its entirety.

Figure 6:
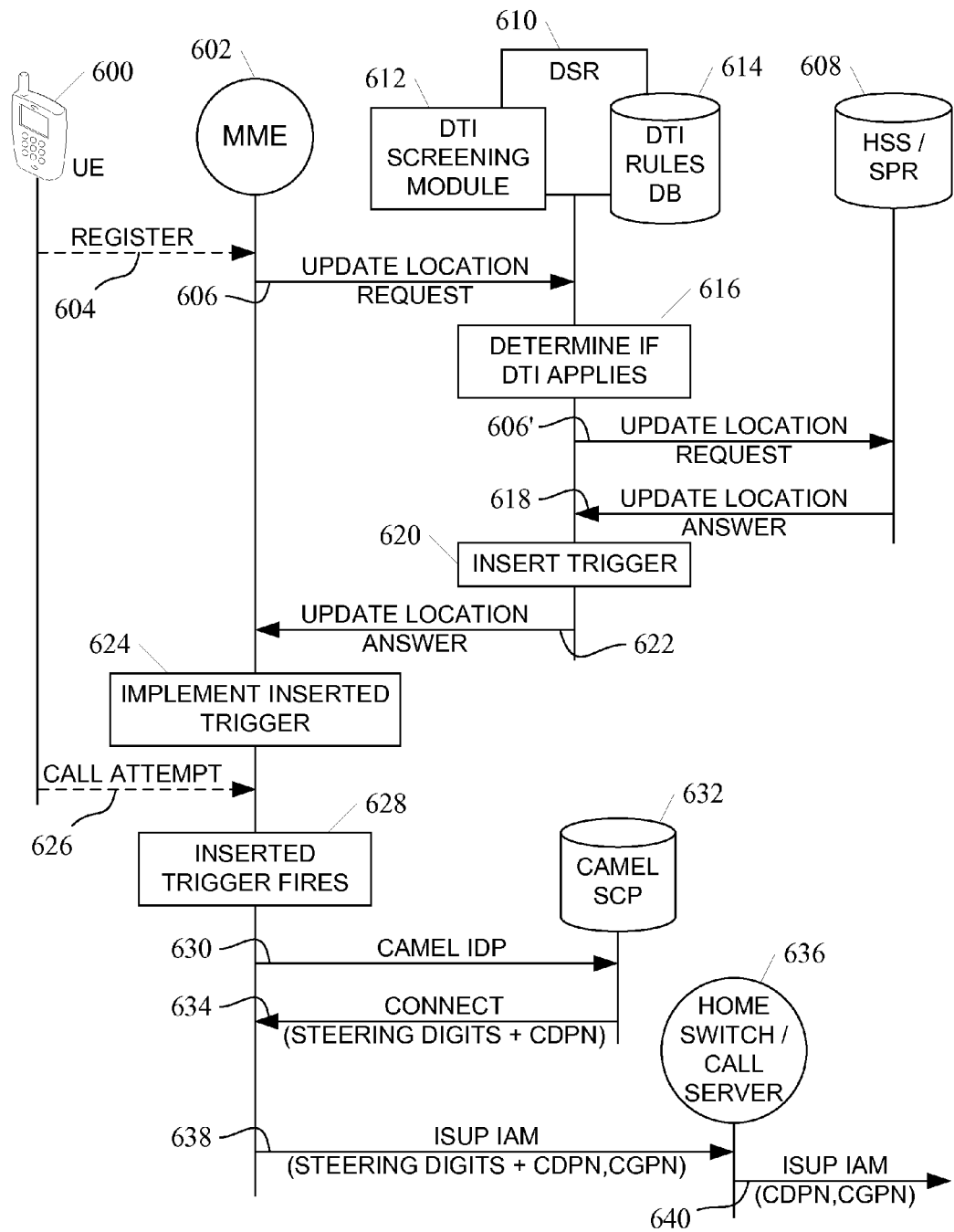
FIG. 6 is a block diagram showing an exemplary system for dynamically and conditionally setting service triggers in a mobile long term evolution (LTE) communications network according to an embodiment of the subject matter described herein.

FIG. 6 is a block diagram showing an exemplary system for dynamically and conditionally setting service triggers in a communications network according to an embodiment of the subject matter described herein. In the embodiment illustrated in FIG. 6, a subscriber's user equipment (UE) 600 has roamed into a mobile long term evolution (LTE) network that includes a mobility management entity (MME) 602. In response to detection of the presence of MS 600, e.g., when UE 600 makes a registration request 604, MME 602 notifies the subscriber's home network of the current location of UE 600, e.g., by issuing a DIAMETER protocol update location request 606 directed to the home subscriber server (HSS) or subscriber profile repository (SPR) 608 in the subscriber's home network. DIAMETER update location request 606, which includes an identifier associated with UE 600, is routed through and intercepted by DIAMETER signal routing node (DSR) 610. A dynamic trigger insertion (DTI) module 612 within DSR 610 processes DIAMETER update location request 606 according to trigger insertion rules, which may be stored in a DTI rules database 614 or other storage means.

In one embodiment, DTI rules database 614 may be provisioned with subscriber identifiers, including but not limited to mobile station integrated services digital network (MSISDN) numbers, international mobile subscriber identity (IMSI) numbers, etc., that have been associated with the DTI service. In alternate embodiments, DTI rules may be based on ingress signaling link/linkset, time of day, day of week, or other characteristics.

In embodiment illustrated in FIG. 6, at block 616, DTI module 612 determines, based on the received DIAMETER update location request 606, that the registering mobile subscriber is currently roaming and that subsequent or related insert subscriber data (ISD) message(s) should be intercepted and modified. DSR 610 forwards update location request 606 (or generates and sends a new update location request 606') to HSS/SPR 608.

HLR/HSS 608 receives update location request 606, and responds by issuing update location answer 618. DTI module 610 intercepts update location answer 618, determines whether any DTI rules within DTI rules database 614 apply, and if so, modifies update location answer 618 accordingly. For example, at block 620, DTI module 612 may modify update location answer 618 to include a new CAMEL service trigger. The modified update location answer 622 is then forwarded to MME 602, which in block 624 implements the CAMEL service trigger.

In one example, the inserted trigger may be an originating call attempt trigger. When a subscriber with which the service trigger is set attempts to place a call, the CAMEL call origination attempt trigger is fired by the serving switch. In the embodiment illustrated in FIG. 6, for example, the mobile subscriber having a calling party number (CgPN) attempts to call another subscriber having a called party number (CdPN), shown as call attempt 626, which is detected at MME 602. Within MME 602, the inserted trigger fires (block 628) in response to detecting call attempt 624, causing MME 602 to launch a CAMEL IDP query 630 to a CAMEL service control point (SCP) 632. In one embodiment, the CAMEL IDP query may include the called party number (CdPN) and/or the calling party number (CgPN).

CAMEL SCP 632 receives the IDP query and uses information provided in the IDP query to determine the appropriate routing for the call. For example, CAMEL SCP 632 may return a RELEASE message to the serving switch (indicating to the switch that the call should not proceed) or a CONTINUE message (indicating the switch should route the call as per the switches provisioned routing rules) or a CONNECT message (indicating the switch should use the routing information returned in the CONNECT to route the call).

In the embodiment illustrated in FIG. 6, CAMEL SCP 632 sends a CONNECT message 634 to MME 602. In one embodiment, CONNECT message 634 includes steering digits as well as the original CdPN, which may be in concatenated form. The routing information included in the CONNECT message may include steering digits, a routing number (RN), or any routable identifier/address (e.g., 2124405555). The original CdPN identifier (e.g., 9193803814) is post-pended to the steering digits/RN/routable address identifier (e.g., 2124405555#9193803814).

In the case where the serving switch receives a CONNECT message, the serving switch uses the steering digits (e.g., 2124405555) to determine an egress route from the switch. The serving switch generates an ISUP IAM message that includes both the steering digit and original CdPN information. In one embodiment, the steering digit and original CdPN info is included in the ISUP IAM CdPN parameter in the concatenated/post-pended format (e.g., 2124405555#9193803814).

Figure 7:
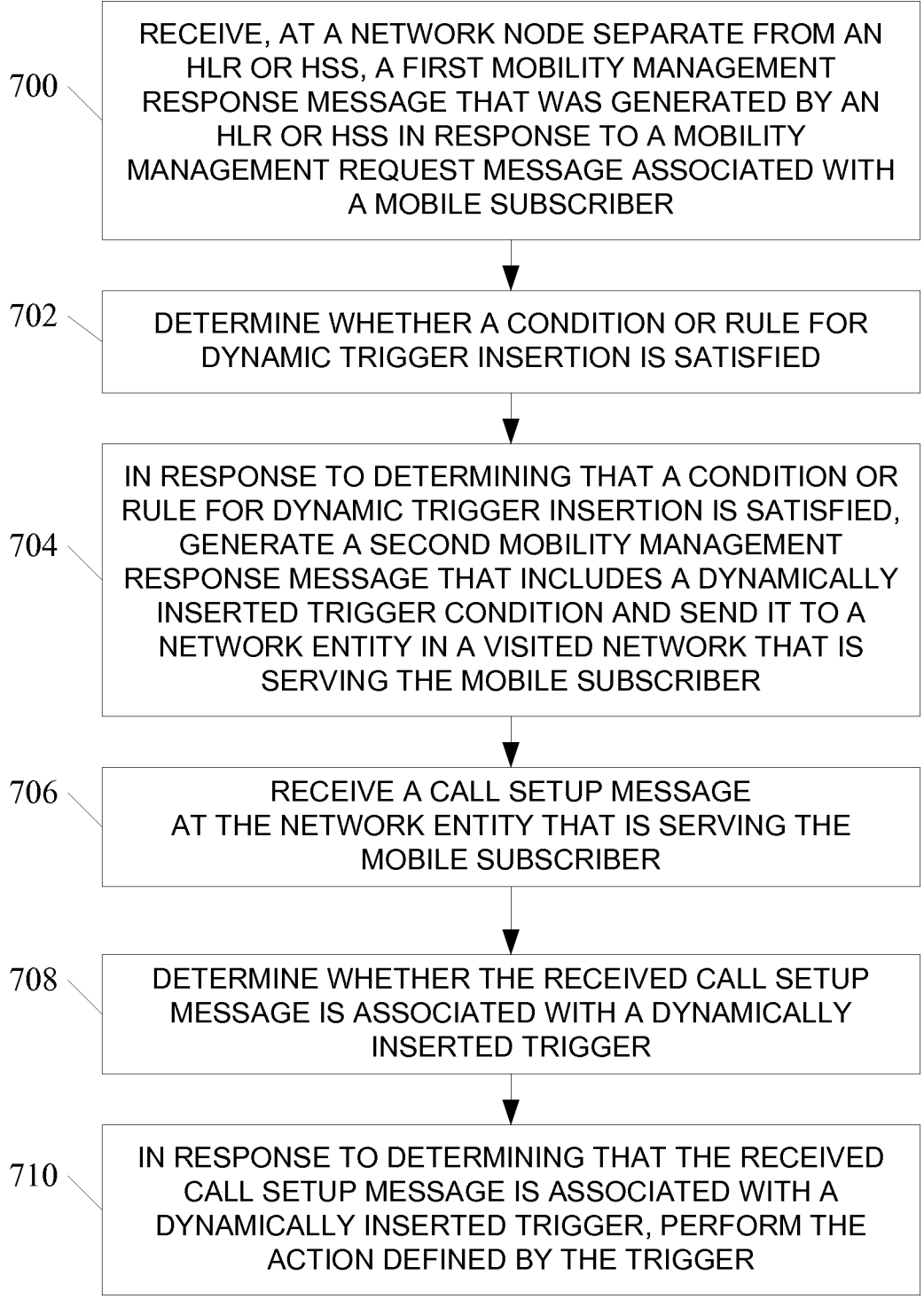
FIG. 7 is a flow chart illustrating an exemplary process for dynamically and conditionally setting service triggers in a communications network according to an embodiment of the subject matter described herein.

FIG. 7 is a flow chart illustrating an exemplary process for dynamically and conditionally setting service triggers in a communications network according to an embodiment of the subject matter described herein.

At block 700, a network node separate from an HLR or HSS receives a first mobility management response message that was generated by an HLR or HSS in response to a mobility management request message associated with a mobile subscriber. For example, referring to FIG. 1, a service broker, STP 110, which is separate from an HLR/HSS 108, receives a mobility management response message, such as ISD message 118, that was generated by HLR 108 in response to mobility management message, such as update location message 106. In another example, referring to FIG. 6, DSR 610 may receive update location answer 618, which was generated by HSS 608 in response to update location request 606.

At block 702, it is determined whether a condition or rule for dynamic trigger insertion is satisfied. For example, STP 110 in FIG. 1 may determine that ISD message 118 is addressed to a visitor location register that is not within the home network, e.g., by analyzing the MSC ID of the message destination.

At block 704, in response to determining that a condition or rule for dynamic trigger insertion is satisfied, a second mobility management response message is generated, including a dynamically inserted trigger condition. The second mobility management response message is sent to a network entity that is within a visited network and that is serving the mobile subscriber. In one embodiment, the network entity that is serving the mobile subscriber receives the second mobility management response message containing the dynamically inserted trigger and implements the dynamically inserted trigger.

At block 706, the network entity that is serving the mobile subscriber receives a call setup message.

At block 708, it is determined whether the received call setup message is associated with a dynamically inserted trigger.

At block 710, in response to determining that the received call setup message is associated with a dynamically inserted trigger, the action defined by the trigger is performed by the network entity that is serving the mobile subscriber.

Figure 8:
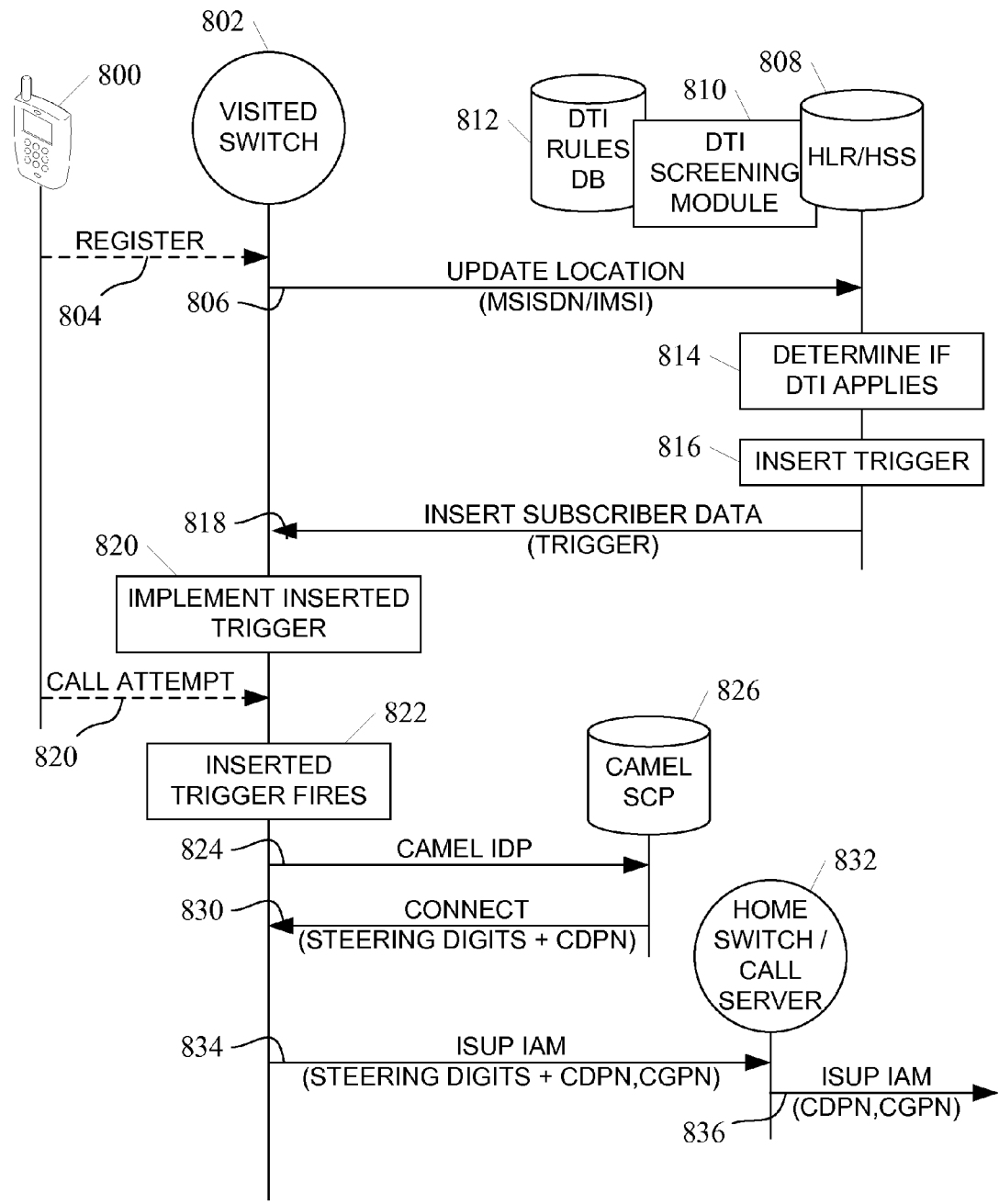
FIG. 8 is a block diagram showing an exemplary system for dynamically and conditionally setting service triggers in a communications network according to another embodiment of the subject matter described herein.

FIG. 8 is a block diagram showing an exemplary system for dynamically and conditionally setting service triggers in a communications network according to another embodiment of the subject matter described herein. In the embodiment illustrated in FIG. 9, a subscriber using a mobile station (MS) 800 has roamed into a mobile network that is served by a visited switch 802. In response to receiving registration request 804, visited switch 802 notifies the subscriber's home network of the current location of mobile terminal 800, e.g., by issuing a mobile application part (MAP) update location message 806 directed to a node for maintaining mobility information for mobile subscribers, such as a home location register/home subscriber server (HLR/HSS) 808 in the subscriber's home network. In one embodiment, HLR/HSS 808 includes a dynamic trigger insertion (DTI) module 810 that uses dynamic trigger insertion rules, which may be stored in a DTI rules database 812 or other storage means, to determine whether DTI applies.

At block 814, DTI module 810 determines if DTI rules apply, and if so, at block 816 DTI module 810 generates a response to the mobility management message that includes a dynamically inserted trigger. For example, DTI module 810 may generate an ISD message 818 that includes the inserted trigger. Message 818 is sent to visited switch 802. At block 124, visited switch 802 implements the inserted trigger DTI rules apply, DTI module 810 may modify ISD message 118 accordingly. For example, at block 120, DTI module 112 may modify ISD message 118 to include a new CAMEL service trigger. The modified ISD message (ISD') 122 is then forwarded to visited switch office 102, which in block 820 implements the CAMEL service trigger. If no DTI rules apply, DTI module 810 may send to visited switch 102 an ISD message that does not include a dynamically inserted trigger.

When visited switch 802 detects a call attempt 820, visited switch 802 may fire or initiate the inserted trigger (block 822), which causes visited switch 802 to launch a CAMEL IDP query 824 to a CAMEL service control point (SCP) 826. CAMEL SCP 826 receives IDP query 824 and uses information provided in the IDP query to determine the appropriate routing for the call. In the embodiment illustrated in FIG. 8, CAMEL SCP 826 sends a CONNECT message 830 to visited switch 802, the CONNECT message including steering digits as well as the original CdPN, which may be in concatenated form, which visited switch 802 uses to route the call. In this example, the roaming subscriber's call is routed to a home switching office/call server 832 in the subscriber's home network. For example, visited switch 802 may issue an ISUP IAM message 834 that includes the steering digits as well as the called party number CdPN and the calling party number CgPN. Home switching office/call server 832 is configured to strip out the steering digit information from ISUP IAM message 834 and proceed with call setup towards the original CdPN, e.g., by sending ISUP IAM message 836.

Figure 9:
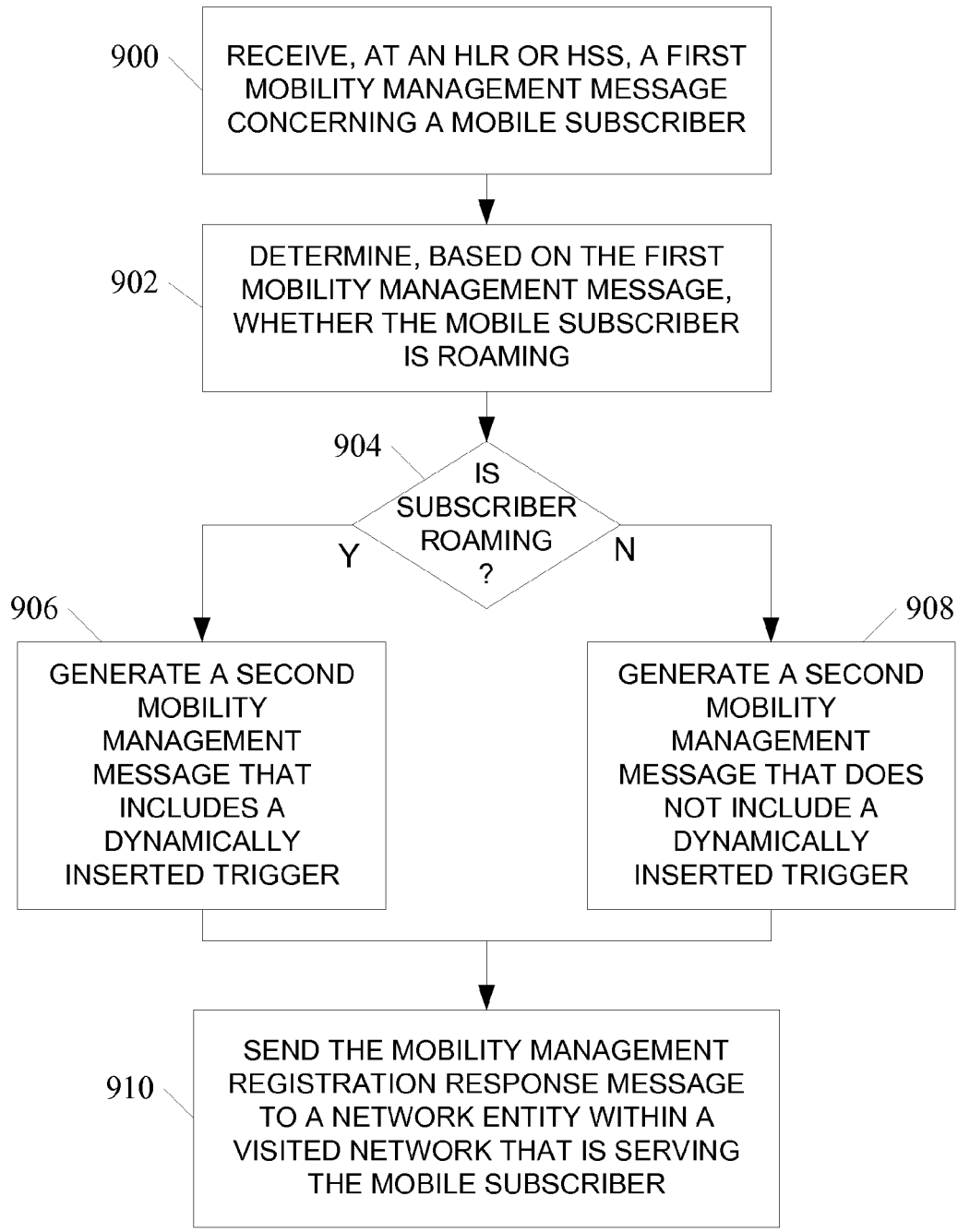
FIG. 9 is a flow chart illustrating an exemplary process for dynamically and conditionally setting service triggers in a communications network according to another embodiment of the subject matter described herein.

FIG. 9 is a flow chart illustrating an exemplary process for dynamically and conditionally setting service triggers in a communications network according to another embodiment of the subject matter described herein.

At block 900, a node for maintaining mobility information for mobile subscribers, such as an HLR, an HSS, an SPR, and the like, receives a first mobility management message concerning a mobile subscriber. For example, referring to FIG. 8, HLR/HSS 808 receives update location message 806.

At block 902, it is determined, based on the first mobility management message, whether the mobile subscriber is roaming (e.g., FIG. 8, block 814.) At block 904, if it is determined that the subscriber is roaming, the process moves to block 906, in which a second mobility management message that includes a dynamic trigger to be set for the mobile subscriber is generated (e.g., FIG. 8, block 816.) However, if at block 904 it is determined that the subscriber is not roaming, the process moves instead to block 908, in which a second mobility management message that does not include roaming trigger information is generated.

At block 910, the second mobility management message (with or without an inserted trigger) is sent to a network entity that is within a visited network and that is serving the mobile subscriber (e.g., FIG. 8, message 818.)

It will be understood that various details of the subject matter described herein may be changed without departing from the scope of the subject matter described herein. Furthermore, the foregoing description is for the purpose of illustration only, and not for the purpose of limitation.

What is claimed is:

1. A system for dynamic and conditional trigger insertion, the system comprising:
    a dynamic trigger insertion (DTI) database for maintaining conditions for dynamic trigger insertion, wherein at least some of the conditions are associated with a trigger type and a trigger parameter, wherein the trigger type comprises a subscriber-based trigger, a line-based trigger, or an office based trigger, and wherein the trigger parameter comprises at least one customized application for mobile networks enhanced logic (CAMEL) service control point (SCP) address for a CAMEL SCP;
    a DTI screening module for intercepting a first mobility management message and for generating a second mobility management message, wherein the first mobility management message is a mobile application part (MAP) update location message and the second mobility management message is a MAP insert subscriber data message, the first mobility management message being directed towards a node associated with a home network of a mobile subscriber, wherein the node comprises a home subscriber server (HSS), a home location register (HLR), or a subscriber profile repository (SPR), and wherein the DTI screening module uses the conditions of the DTI database to determine whether a condition for dynamic trigger insertion is satisfied, and, in response to determining that a condition for dynamic trigger insertion is satisfied, the second mobility management message that is generated at the DTI screening module includes a dynamically inserted trigger adapted for implementation within a visited network, and in response to determining that a condition for dynamic trigger insertion is not satisfied, the second mobility management message that is generated does not include the dynamically inserted trigger;
    wherein the dynamically inserted trigger of the second mobility message is implemented in the visited network upon occurrence of a trigger firing event, and wherein the trigger firing event invokes a query to the CAMEL SCP having the at least one CAMEL SCP address specified by the trigger parameter for determining appropriate routing for a call to or from the mobile subscriber, and wherein the CAMEL SCP instructs the visited network to release the call, continue the call, or steer the call.

2. The system of claim 1 wherein the DTI screening module is a component of the HSS, the HLR, or the SPR.

3. The system of claim 2 wherein the first mobility management message is a DIAMETER update location request message and the second mobility management message is a DIAMETER update location answer message.

4. The system of claim 1 wherein the DTI screening module is a component of a network node that is separate from the home subscriber server (HSS), the home location register (HLR), and the subscriber profile repository (SPR).

5. The system of claim 4 wherein the first and second mobility management messages are mobile application part (MAP) insert subscriber data messages.

6. The system of claim 1 wherein the conditions of the DTI database include criterion based upon at least one of a day of the week, a time of day, a subscriber ID, a network congestion indicator, a network condition, or a network status.

7. The system of claim 6 wherein the entity that is serving the mobile subscriber comprises one of: a mobile switching center (MSC), a mobility management entity (MME), a media gateway (MGW), and a media gateway controller (MGC).

8. The system of claim 7 wherein the entity that is serving the mobile subscriber is configured to receive a call signaling message, determine whether a dynamically inserted trigger should be applied, and, upon a determination that a dynamically inserted trigger should be applied, perform the action defined by the dynamically inserted trigger.

9. The system of claim 1 wherein the conditions of the DTI database are used to determine whether the mobile subscriber is roaming.

10. The system of claim 1 wherein the DTI screening module implements law enforcement functions.

11. The system of claim 10 wherein the law enforcement functions include communications assistance for law enforcement act (CALEA) functions.

12. The system of claim 1 wherein the DTI screening module implements play ad pay less services.

13. The system of claim 1 wherein the DTI screening module implements a quality of service diagnostic tap function.

14. The system of claim 1 wherein the DTI screening module implements a parental control function.

15. A method for dynamic and conditional trigger insertion, the method comprising:
    intercepting, at a node in a telecommunications network, a first mobility management message that is directed towards a home subscriber server (HSS), a home location register (HLR), or a subscriber profile repository (SPR), wherein the first mobility management message is a mobile application part (MAP) update location message;
    determining whether a condition for dynamic trigger insertion is satisfied, wherein the condition is associated with a trigger type and a trigger parameter, the trigger type comprising a subscriber-based trigger, a line-based trigger, or an office based trigger, and the trigger parameter comprising at least one customized application for mobile networks enhanced logic (CAMEL) service control point (SCP) address for a CAMEL SCP;
    generating a second mobility management message, wherein the second mobility management message is a MAP insert subscriber data message;
    inserting, in response to determining that a condition for dynamic trigger insertion is satisfied within the second mobility management message, a dynamically inserted trigger adapted for implementation within a visited network, and in response to determining that a condition for dynamic trigger insertion is not satisfied, the second mobility management message that is generated does not include the dynamically inserted trigger; and
    forwarding the second mobility message to the visited network, wherein the dynamically inserted trigger of the second mobility message is implemented in the visited network upon occurrence of a trigger firing event, and wherein the trigger firing event invokes a query to the CAMEL SCP having the at least one CAMEL SCP address specified by the trigger parameter for determining appropriate routing for a call to or from the mobile subscriber, and wherein the CAMEL SCP instructs the visited network to release the call, continue the call, or steer the call.

16. The method of claim 15 wherein the first mobility management message is a DIAMETER update location request message and the second mobility management message is a DIAMETER update location answer message.

17. The method of claim 15 wherein the node in the telecommunications network comprises a network node that is separate from the home subscriber server (HSS), the home location register (HLR), and the subscriber profile repository (SPR).

18. The method of claim 17 wherein the first and second mobility management messages are mobile application part (MAP) insert subscriber data (ISD) messages.

19. The method of claim 15 wherein the first mobility management message comprises a registration message associated with the mobile subscriber.

20. The method of claim 15 wherein determining whether a condition for dynamic trigger insertion is satisfied includes analyzing a content of the first mobility management response message.

21. The method of claim 20 wherein determining whether a condition for dynamic trigger insertion is satisfied includes analyzing a called party number or a calling party number associated with the response message.

22. The method of claim 15 wherein determining whether a condition for dynamic trigger insertion is satisfied includes determining a signaling link on which the first mobility management response message is received.

23. The method of claim 15 wherein determining whether a condition for dynamic trigger insertion is satisfied includes applying criterion based upon at least one of a day of the week, a time of day, a subscriber ID, a network congestion indicator, a network condition, or a network status.

24. The method of claim 23 comprising, at the entity that is serving the mobile subscriber:
receiving the second mobility management message including the dynamically inserted trigger; and
in response to receiving the second mobility management message, extracting the dynamically inserted trigger information and implementing the dynamically inserted trigger.

25. The method of claim 24 comprising, at the network entity that is serving the mobile subscriber:
receiving a call setup message;
determining whether the received call setup message is associated with a dynamically inserted trigger; and
in response to determining that the received call setup message is associated with a dynamically inserted trigger, performing the action defined by the dynamically inserted trigger.

26. The method of claim 15 wherein the second mobility message is received at an entity that is serving the mobile subscriber and comprises one of: a mobile switching center (MSC), a mobility management entity (MME), a media gateway (MGW), and a media gateway controller (MGC).

27. The method of claim 15 wherein determining whether a condition for dynamic trigger insertion is satisfied includes determining whether the mobile subscriber is roaming.

28. The method of claim 27 comprising, in response to determining that the mobile subscriber is roaming, generating the second mobility management message that includes the dynamically inserted trigger.

29. A computer readable medium having stored thereon non-transitory executable instructions that when executed by the processor of a computer control the computer to perform steps comprising:
intercepting, at a node in a telecommunications network, a first mobility management message that is directed towards a home location register (HLR), a home subscriber server (HSS), or a subscriber profile repository (SPR) and is associated with a mobile subscriber, wherein the first mobility management message is a mobile application part (MAP) update location message;
determining whether a condition for dynamic trigger insertion is satisfied, wherein the condition is associated with a trigger type and a trigger parameter, the trigger type comprising a subscriber-based trigger, a line-based trigger, or an office based trigger, and the trigger parameter comprising at least one customized application for mobile networks enhanced logic (CAMEL) service control point (SCP) address for a CAMEL SCP;
generating a second mobility management message, wherein the second mobility management message is a MAP insert subscriber data message;
inserting, in response to determining that a condition for dynamic trigger insertion is satisfied within the second mobility management message, a dynamically inserted trigger adapted for implementation within a visited network, and in response to determining that a condition for dynamic trigger insertion is not satisfied, the second mobility management message that is generated does not include the dynamically inserted trigger; and
forwarding the second mobility message to the visited network, wherein the dynamically inserted trigger of the second mobility message is implemented in the visited network upon occurrence of a trigger firing event, and wherein the trigger firing event invokes a query to the CAMEL SCP having the at least one CAMEL SCP address specified by the trigger parameter for determining appropriate routing for a call to or from the mobile subscriber, and wherein the CAMEL SCP instructs the visited network to release the call, continue the call, or steer the call.

* * * * *